United States Patent [19]
Yuan

[11] Patent Number: 5,443,695
[45] Date of Patent: Aug. 22, 1995

[54] DISTILLATION APPARATUS FOR CONCENTRATING LESS VOLATILE LIQUIDS

[75] Inventor: Wallace I. Yuan, Irvine, Calif.

[73] Assignee: Athens Corporation, Oceanside, Calif.

[21] Appl. No.: 22,995

[22] Filed: Feb. 26, 1993

[51] Int. Cl.⁶ ................................ B01D 3/26; B01D 3/42
[52] U.S. Cl. .................................... 202/153; 202/158; 202/160; 202/161; 202/176; 202/185.1; 202/185.6; 203/1; 203/2; 203/3; 203/DIG. 2; 203/DIG. 18; 203/DIG. 19; 203/DIG. 25
[58] Field of Search ............... 202/158, 161, 185.6, 202/185.1-185.5, 234, 235, 160, 176; 203/1-3, 12, DIG. 25, DIG. 2, DIG. 19, DIG. 18; 196/132, 141, 100

[56] References Cited

U.S. PATENT DOCUMENTS

| | | | |
|---|---|---|---|
| 1,463,154 | 7/1923 | Cummins | 202/185.6 |
| 1,870,854 | 8/1932 | Lewis . | |
| 2,405,393 | 8/1946 | Atkins, Jr. . | |
| 2,553,469 | 5/1951 | Pellettere . | |
| 2,856,331 | 10/1958 | Rosenthal et al. . | |
| 2,900,312 | 8/1959 | Gilmore . | |
| 3,282,799 | 11/1966 | MacMullan | 203/3 |
| 3,325,376 | 6/1967 | Eckert | 202/158 |
| 3,340,157 | 9/1967 | Weiss | 202/180 |
| 3,392,088 | 7/1968 | Johnson . | |
| 3,418,081 | 12/1968 | Graver et al. | 203/2 |
| 3,451,895 | 6/1969 | Webb | 203/2 |
| 3,573,172 | 3/1971 | Streuber | 202/158 |
| 3,663,375 | 5/1972 | Witheford . | |
| 3,696,003 | 10/1972 | Fitch et al. | 202/185.6 |
| 3,736,234 | 5/1973 | Miyamoto | 202/185.6 |
| 4,071,398 | 1/1978 | Baierl . | |
| 4,089,749 | 5/1978 | Karamian | 202/185.6 |
| 4,229,261 | 10/1980 | Heck et al. . | |
| 4,262,791 | 4/1981 | Lynch | 203/3 |
| 4,664,754 | 5/1987 | Caputi et al. . | |
| 4,828,660 | 5/1989 | Clark et al. . | |
| 4,855,023 | 8/1989 | Clark et al. . | |
| 4,936,955 | 6/1990 | Dobson et al. . | |
| 4,980,032 | 12/1990 | Dobson et al. . | |
| 5,032,218 | 7/1991 | Dobson et al. . | |
| 5,061,348 | 10/1991 | McCormick et al. . | |
| 5,225,048 | 7/1993 | Yuan | 203/1 |
| 5,236,555 | 8/1993 | Yuan | 203/1 |

Primary Examiner—Wilbur Bascomb, Jr.
Attorney, Agent, or Firm—Knobbe, Martens, Olson & Bear

[57] ABSTRACT

The invention relates to an improved method and a novel apparatus for the concentration, separation, and purification of contaminated chemical compounds, wherein the chemical compound is less volatile than the contaminant. The distillation is performed using constant, predetermined distillation parameters.

35 Claims, 4 Drawing Sheets

DISTILLATION APPARATUS FOR CONCENTRATING LESS VOLATILE LIQUIDS

FIELD OF THE INVENTION

The present invention relates to an improved apparatus and method to concentrate liquids of relatively low volatility. More particularly, the invention relates to a novel apparatus and method for the regeneration and purification of chemicals that are less volatile than the contaminant sought to be removed, using a simple and efficient distillation process.

BACKGROUND OF THE INVENTION

In a variety of technologies that utilize chemicals, in order to recycle or reuse the chemicals one must eliminate water and/or other associated impurities. For example, a number of industries utilize large volumes of concentrated inorganic acids as cleaning or etching agents.

This is particularly true in the manufacturing processes of electronic and semiconductor devices. There, parts, such as integrated circuit wafers and printed circuit boards, must be washed in concentrated acid in either an etching step or a cleaning step. One specific example is the pre-diffusion cleaning and photoresist stripping that is accomplished in the manufacture of integrated circuit wafers through the use of concentrated sulfuric acid and accompanying oxidants, for instance, an aqueous solution of hydrogen peroxide.

Inevitably, therefore, the acid baths used for the above purposes become contaminated, such as from the materials cleaned or etched, mixed; or become mixed with the water carried by the oxidant, and/or absorb water from various sources. Most of the contaminants, other than water, have proven relatively simple to remove from the acids. Unlike water, such contaminants may be filtered, precipitated and filtered, or driven off from the acid through use of fairly moderate heat. However, because acids are in general hydrophilic, it has heretofore been difficult to regenerate and purify acids to the concentration that is necessary to reuse the acids in the given industrial process.

Consequently, there has been a tendency for industries to generate enormous quantities of acid wastes. This is neither economical nor is it environmentally sound. Thus, a need exists for small scale, on-site equipment for reprocessing of such chemicals. Indeed, the art has recognized this need and there has been increased attention to the development of methods and apparatus to recycle and purify chemical wastes, such as acids. E.g., U.S. Pat. Nos. 4,828,660 and 4,855,023.

In these aforementioned patents, the oxidizing agents and other contaminants were first stripped from the used contaminated acids, with the combination of heating the mixture and purging the mixture with air or an inert gas stream to remove the water. However, this process is fairly slow and not particularly efficient. Nevertheless, a interesting finding arose in this art, that the resulting recycled concentrated acids may, in many cases, be purer than the commercially purchased starting acid.

In patent applications, Ser. Nos. 07/648,543, now U.S. Pat. No. 5,225,048 and 07/783,632, now U.S. Pat. No. 5,236,555 a method and an apparatus are disclosed, respectively, to concentrate liquids through a distillation process utilizing constant, predetermined parameters. Such parameters include, water content and flow rate of the feed, the distillate flow rate, and the heating power for the distillation column. These applications are directed primarily at situations in which the chemical sought to be purified is more volatile than water. More specifically, they are directed toward reprocessing single or multiple-phase organic solvents that are more volatile than water.

In the case of concentrated acids, and also many other chemical compounds, the chemical compound sought to be purified is less volatile than water. In such situations, many problems not encountered with more volatile chemicals will become evident to one skilled in the art.

Thus, there remains a need in the chemical reprocessing and purification art for an apparatus and method to more efficiently reprocess and purify chemical compounds, wherein the chemical compound sought to be purified is less volatile than its contaminants. Accordingly, it is one object of the present invention to provide a method for the concentration, separation, and purification of such chemical compounds, and, in particular, water-contaminated liquids, such as inorganic acids.

Another object of the present invention is to provide a novel apparatus for the concentration, separation, and purification of such chemical compounds, in particular as applied to used inorganic acids.

SUMMARY OF THE INVENTION

The present invention relates to an improved method and apparatus for the concentration, separation, and purification of contaminated chemical compounds wherein the chemical compound sought to be concentrated, separated, and purified is less volatile than the contaminants.

In accordance with one aspect of the present invention, there is provided a method for removing a liquid contaminant from a chemical compound, wherein the chemical compound is less volatile than the contaminant, comprising the steps of:

providing a feedstock of the contaminated compound having a known contaminant concentration;

providing a distillation apparatus having a top, a bottom, and a container at the bottom;

introducing said feedstock into said distillation apparatus between the top and the bottom at a constant rate, such that said feedstock collects in said container;

applying heat to the container at a constant rate to vaporize the contaminant; and removing the chemical compound from which the contaminant has been removed at a constant rate from the container.

In a preferred embodiment, the method further comprises using a distillation apparatus that includes a condenser, and the additional step of condensing the vaporized contaminant. Moreover, the method may optionally further comprise the step of removing the condensed contaminant from the distillation apparatus at a constant rate. In addition, in a preferred embodiment, the method further comprises adjusting the relative concentrations of the contaminant and the chemical compound in the feedstock to predetermined, substantially constant values prior to introducing the feedstock into the container.

In accordance with another aspect of the present invention, there is provided a second method for removing a liquid contaminant from a chemical compound, wherein the chemical compound is less volatile than the contaminant, comprising the steps of:

provide a feedstock of the contaminated compound having a known concentration of the contaminant;

providing a distillation apparatus having a top, a bottom, and a container at the bottom;

introducing said feedstock into said distillation apparatus between the top and the bottom at a constant rate, such that said feedstock collects in said container;

applying heat to the container at a constant rate to vaporize the contaminant; and condensing the vaporized contaminant to produce a condensed contaminant;

removing the condensed contaminant at a constant rate from the distillation apparatus.

In this embodiment, the method preferably further comprises removing the chemical compound from the container at a constant rate. Moreover, as before, the method preferably further comprises the step of adjusting the relative concentrations of the contaminant and the chemical compound in the feedstock to predetermined, substantially constant values prior to introducing the feedstock into the container.

In accordance with another aspect of the method of the present invention, there is provided a method for removing a liquid contaminant from a chemical compound, wherein the chemical compound is less volatile than the contaminant, comprising the steps of:

providing a feedstock of the contaminated compound having a known concentration of the contaminant;

providing a distillation apparatus having a top, a bottom, and a container at the bottom;

introducing said feedstock into said distillation apparatus between the top and the bottom, such that said feedstock collects in said container;

applying heat to the container at a constant rate to vaporize the contaminant; and removing the chemical compound from which the contaminant has been removed at a constant rate from the container.

In a preferred embodiment of the method, the distillation apparatus includes a condenser, and the method further comprises the step of condensing the vaporized contaminant. Preferably, the method additionally comprises the step of removing the condensed contaminant from the distillation apparatus at a constant rate. Moreover, in a highly preferred embodiment, the method further comprises the step of adjusting the relative concentrations of the contaminant and the chemical compound in the feedstock to predetermined, substantially constant values prior to introducing the feedstock into the container.

In each of the above-described methods, in a preferred embodiment, the chemical compound is an inorganic acid and the contaminant is water. In a highly preferred embodiment, the chemical compound is sulfuric acid and the contaminant is water. In addition, in such embodiments, the feedstock is preferably introduced into said container.

In accordance with another aspect of the present invention, there is provided an apparatus for removing a liquid contaminant from a chemical compound, wherein the chemical compound is less volatile than the contaminant, comprising:

a distillation apparatus, wherein the distillation apparatus further comprises:

means for introducing said contaminated chemical compound into said distillation apparatus at a constant flow rate;

a container for receiving said contaminated chemical compound;

means for applying heat to the container at a constant rate to vaporize the contaminant;

a condensing chamber in fluid communication with the container for condensing the vaporized contaminant;

means for removing condensed contaminant from the condensing chamber and the distillation apparatus at a constant rate that is less than the rate at which the contaminant is condensed in condensing chamber; and means for removing the chemical compound from the container at a constant rate.

In a preferred embodiment, the means for applying heat is a direct heat source, for example, an electrical resistance heater. In the alternative, the means for applying heat can be an indirect heater. In another preferred embodiment, the condensing chamber has sufficient cooling area for total condensation of a vapor entering the condensing chamber. The condensing chamber may comprise a condenser which further comprises an inlet port in fluid communication with an elongated cylindrical supporting column structure with cooling coils deployed within the supporting column structure. Optionally, the condenser may further comprise baffle plates adapted to aid in the effective contact of vapor with the cooling coils. Also, the condenser may further comprise a vent to maintain substantially constant pressures within the distillation apparatus. In preferred embodiments, the condenser further comprises one or more means for monitoring the temperature of the condenser.

In another preferred embodiment, the supporting column of the condenser defines an axis which is inclined in relation to horizontal, at a positive angle between about 2 and 20 degrees. Preferably, the positive angle is about 5 degrees to horizontal.

Optionally, the distillation apparatus may further comprise a distillation column interposed between the condensing chamber and the container, providing fluid communication therebetween. Such distillation column may advantageously be a bubble-cap type, sieve plate type, cartridge type, or a packed column. In preferred embodiments, the distillation column is a packed distillation column, in which the preferred packing materials include Raschig rings, Lessing rings, Berl saddles, spiral partition rings, and grid packing. Most preferably, the packing materials are Raschig rings.

In another preferred embodiment, the distillation column further comprises one or more overflow weirs interposed inside the column below the condensing chamber. Preferably, the overflow weir comprises a partially occluding structure contained within the distillation apparatus, the overflow weir having an attached edge that is substantially sealingly joined or connected to the distillation apparatus and an upper edge that is generally extended inward and elevated in relation to the attached edge. In highly preferred embodiments, the overflow weir comprises an upper edge that is of inconsistent geometry. Such inconsistent geometry is preferably a serrated or v-notched upper edge.

In another preferred embodiment, the distillation apparatus further comprises means for adjusting the relative concentrations of chemical compound and contaminant in feedstock introduced into the container. In such embodiment, it is preferred that the apparatus further comprise means for determining the concentration of the chemical compound or the contaminant prior to introduction of same into the container. Preferred means for determining the concentration of the chemical compound or contaminant are conductivity meters, pH meters, hydrometers, reflective index meters, sound velocity meters, and infra-red spectrometers. In highly preferred embodiments, the means is a densitometer.

In preferred embodiments, the means for introducing the contaminated chemical compound is through a down tube extending downward into the container. Moreover, the preferred means for removing the chemical compound comprises a stand tube having a first open end and a second open end, and the tube is adapted to receive chemical compound from the container at a point between the first and second open ends, wherein the first open end extends generally upward from the point and the second open end extends generally downward from the point, the second open end allowing for the discharge of boiling chemical compound from the container, and the first open end operates as a vent. The introducing means preferably includes either a pump in combination with a flow meter, or a metering pump.

In another preferred embodiment, the distillation apparatus further comprises an after cooler for cooling the chemical compound removed from the distillation apparatus. Preferably, the after cooler comprises a cooling column in fluid communication with the chemical compound removing means. Also, the cooling column may further comprise an inlet port separated from an outlet port by a supporting column structure with cooling coils deployed within the supporting column structure. In a preferred embodiment, the inlet port is located elevationally higher than the outlet port. In another preferred embodiment, the cooling column further includes a fluid vent.

The chemical compound removing means in a preferred embodiment preferably operates by permitting overflow out of the container through the removing means, and the removing means further comprises connecting means between said container and said after cooler. In a preferred embodiment, the apparatus further comprises a product tank that is flexibly connected to the after cooler. The flexible connection permits adjustment of the liquid level in the after cooler by changing the relative heights of the chemical compound removing means and said cooling column. This flexible connection, in a preferred embodiment, further comprises a syphon breaking vent at its highest point. In operation, this arrangement allows liquid in the after cooler to flow therefrom to the product tank when the liquid in the after cooler achieves a level determined by the highest point of the flexible connection where the syphon breaking vent is located.

These and other features and advantages of the present invention will become apparent from the detailed description of the preferred embodiments which follows, when considered together with the attached drawings and claims.

DETAILED DESCRIPTION OF THE PREFERRED EMBODIMENTS

Figure 1:
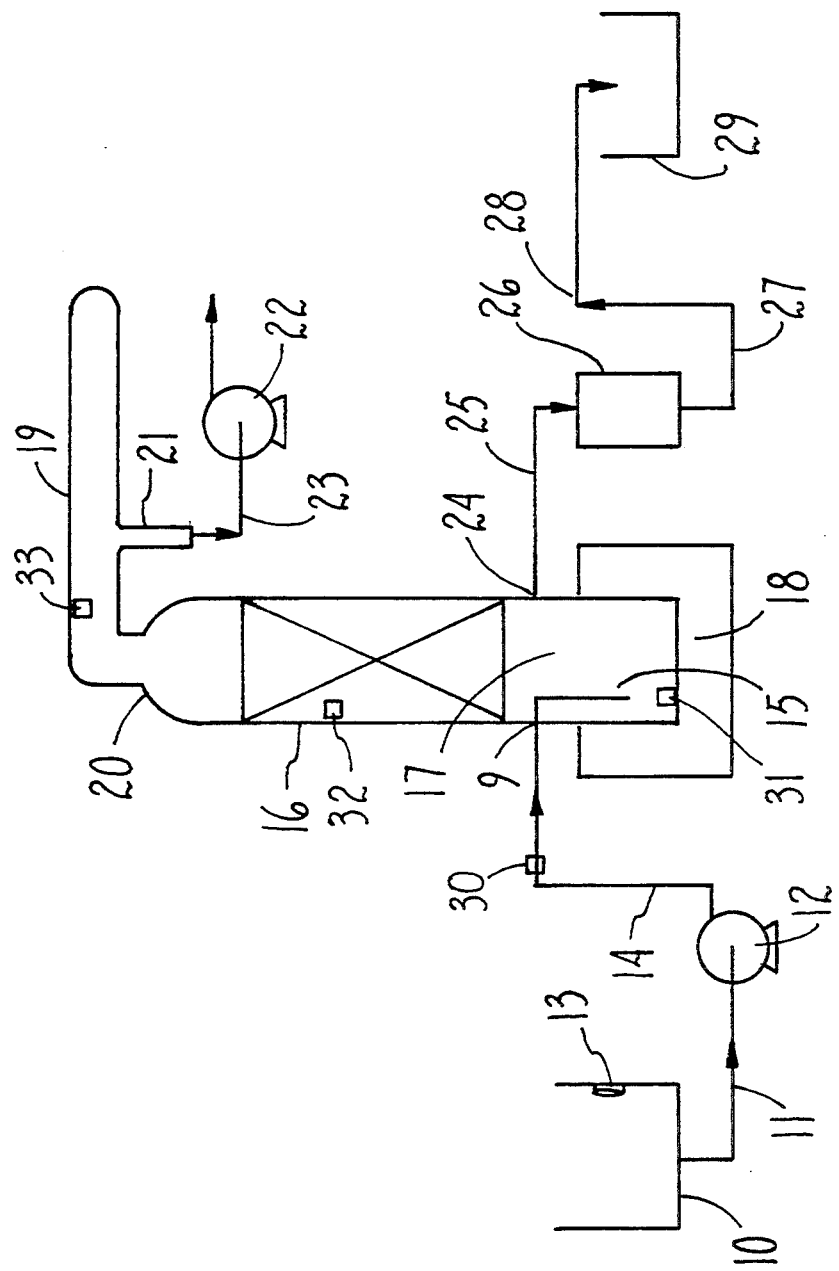
FIG. 1 is a schematic plan view of a preferred embodiment of an apparatus of the present invention.

In accordance with one aspect of the present invention, a method to concentrate, separate, and purify a contaminated chemical compound is described that utilizes operating parameters that are preselected and preset for a certain task and are maintained substantially constant during the entire operation. In this mode of operation, concentration, separation, and purification units prepared in accordance with the present invention remain essentially the same and the apparatus can be adapted to the requirements of each particular application.

This method is broadly applicable to a variety of applications, including, but not limited to, the removal of contaminants from chemical compounds, wherein the chemical compound is less volatile than the contaminant sought to be separated. For example, water may be removed from inorganic acids, such as sulfuric acid.

Accordingly, the term "chemical compound" is used in the broadest sense to cover both organic and inorganic chemicals and their mixtures. Such chemical compounds may be in the form of a single phase or as multi-phase systems. It will be understood that in a variety of industries chemical streams become contaminated with less volatile components. For example, in the semiconductor industry, acid streams (either organic or inorganic, such as sulfuric, nitric, hydrofluoric, and hydrochloric) often become contaminated with water which is often less volatile than the acid.

Also, a variety of light organic phases are used as drying and cleaning agents. Such phases when they become mixed often consist of more and less volatile components. For example, ethers, ketones, alcohols, and the like, when mixed, will often exhibit more and less volatile components.

Each of these substances can be effectively processed through use of the method and apparatus in accordance with the present invention to generate a product that is more volatile than the contaminant to be removed.

One example of a suitable application of the method of the present invention is the concentration, separation, and purification of inorganic acids following their use for etching and/or washing in a broad variety of industrial processes. Subsequent to their use, such inorganic acid systems contain varying amounts of contaminants. Accordingly, an objective of the method and apparatus of the present invention is the removal of accumulated contaminants and any other dissolved and/or particulate impurities from such a system to restore its capabilities and purity for its specific application.

Although the method according to the present invention is equally applicable for the regeneration and purification of a variety of chemical compounds, its advantages are most apparent when the contaminated chemical compound comprises an inorganic acid, contaminated with, among other things, water.

For example, water may be suitably removed from sulfuric acid that has been used in pre-diffusion cleaning or for photoresist stripping in the manufacturing process of electronic and semiconductor devices. In performing the regeneration and purification in this instance, according to the method of one aspect of the present invention, one will determine the optimum regeneration and purification criteria or parameters and preselect the chosen apparatus to perform within such criteria or parameters.

Examples of the criteria or parameters that may be suitably preset are the contaminant-content (or, in the above instance, water-content) of the chemical compound (or, in the above instance, an inorganic acid, such as sulfuric acid) sought to be regenerated or purified, the distillate removal rate, the concentrated product removal rate, the heating power for use in the distillation apparatus, and, in the case of a continuous concentration, separation, and purification system, the feed rate of the contaminated chemical compound, instead of the purified or concentrated product removal rate, as preselected above according to the contaminant-content in the feed.

For most purposes, the process of the present invention can be performed continuously. The term "continuous" is used to describe steady operation conditions. However, the invention may be suitably performed batchwise, to save equipment costs. Of course, in the case of batch distillation applications, as will be understood, the concentrated product will be collected at the end of each batch, rather than continuously.

The above discussed criteria or parameters, once determined and preselected, are maintained substantially constant throughout the concentration, separation, and purification process. In this way, a very high degree of efficiency and consistency is obtained in the purified chemical compound output or the product of the present invention. Furthermore, as will be understood, a single apparatus, may be suitably used for the concentration, separation, and purification of a wide variety of contaminated chemical compounds through the simple readjustment of the operating criteria and parameters.

As was mentioned above, there are a variety of operating parameters and equipment parameters that are variable in commonly used distillation apparatus. These parameters include the height of the distillation column, the feed rate, the feed composition, the product rate, the product composition, the reflux ratio, and the heat power supplied to the apparatus. According to the process of the present invention, the same apparatus is always used and the operating parameters are preset for each particular application, and their variability is minimized or eliminated for the entire operation.

The feed rate primarily depends on the chemical compound usage, and on how frequently a chemical compound system needs to be regenerated before it reaches the upper limit of its permissible contaminant content. The distillate rate, for instance, the contaminant withdrawal rate or waste distillate removal rate, is essentially determined by the feed rate and its contaminant content, whereas the difference of the distillate rate and the feed rate gives the product rate.

By knowing the contaminant content of the contaminated chemical compound to be distilled the feed rate of the contaminated chemical compound into the specifically designed distillation column, the heating power input of the distillation column, and the distillate removal rate, a fixed product rate with a fixed low contaminant-content is achieved.

In a preferred embodiment, the broad objectives of the present invention are implemented through the use of a distillation container (or reboiler) in fluid communication with the distillation apparatus, a heater for heating the distillation container, a distillation column for receiving vapors from the distillation container, a distillate condenser in fluid communication with the distillation column for condensing the vapor from the distillation container, and a distillate collection cup. In a preferred embodiment, the distillate collection cup is situated in fluid communication with the distillate condenser such that some quantity of the distillate may be returned to the distillation column and active participation with the distillation process, and some quantity of the distillate may be retired from participation through a distillate removal port.

Also, where the present invention is desired to be utilized in a continuous process system, such system further comprises: a feed tank to hold the contaminated chemical compound prior to distillation, a feed inlet port to permit the feed to enter the apparatus, a product removal port to remove the chemical compound with lessened contaminant-content from the apparatus, a distillate tank for final collection of the distillate from the apparatus, a product tank for the final collection of the product, and, when necessary, an after-cooler to cool the product.

In each of the above-referenced aspects of the present invention, the initial contaminant concentration of the contaminated chemical compound to be heated is important to optimizing the process. When one goes from a relatively lower contaminant concentration to a relatively higher contaminant concentration, the parameters and/or criteria under which one should undertake a distillation should be modified accordingly. These parameters include, the heating power and the rate at which distillate is retired from active participation in the distillation process or apparatus through the distillate collection cup and the distillate removal port. Also, where the method or apparatus of the present invention are utilized in a continuous operation, variations in the rate that the feed is introduced and differences in the contaminant concentration of the feed from the starting contaminant concentration should be limited.

Consequently, in the method of the present invention it is desirable to preselect, and adjust where necessary, the contaminant concentration of the feed so as to standardize the process parameters. Through knowing the contaminant concentration of the feed and maintaining such concentration substantially constant throughout the distillation, one is able to determine and preselect the other operating conditions and parameters that are desirable to achieve a given product concentration and purity, as well as product yield over time. Thus, for example, with a feedstock of sulfuric acid which might contain from 10% to 20% water, one may wish to add water to the feedstock to standardize it to 20% water content, so that the distillation parameters may remain constant. In the alternative, concentrated acid could be added to adjust the relative concentration of acid to water. In the case where one simply preselects the contaminant concentration then existent in the contaminated chemical compound that they seek to concentrate, separate, and purify, and does not modify the other operating parameters and/or criteria of the system, only product yield and potentially product purity will be affected. Of course, one need not adjust the contaminant concentration in every situation. Adjustment is only necessary where optimization of the performance of the distillation apparatus is sought, such as where high product yield and purity are required.

Thus, while it is preferable to custom select the operating parameters and/or criteria, including preselection and adjustment, where appropriate, of the contaminant concentration of the contaminated chemical compound for each distillation, it is not essential. Instead, the existing contaminant concentration may be left unchanged, and the other operating parameters and/or criteria may be modified accordingly so as to attain the desired product yield and purity.

Each of these aspects of the present invention will be discussed below with reference to the attached drawings and with reference to other preferred embodiments. Also, for the purposes of the following discussion, the apparatus of the present invention will be discussed with the assumption that a continuous process system will be utilized.

Referring now to FIG. 1, there is illustrated a schematic plan view of a continuous distillation apparatus of a preferred embodiment of the present invention. One aspect of the step of feeding the contaminated chemical compound into the distillation apparatus envisioned by the present invention comprises a feed tank 10 situated in fluid communication with the feed meter pump 12 through a first feed tube 11, and ultimately in fluid communication with the distillation column 16 of the distillation apparatus through the feed meter pump 12. In this particular embodiment, the step of analyzing and adjusting the contaminant-content of the contaminated chemical compound to a predetermined level prior to distillation, is accomplished in the feed tank 10.

In a preferred embodiment, the step of analyzing and adjusting the contaminant-content of the contaminated chemical compound to a predetermined level prior to distillation is accomplished through analyzing the feed with a meter 13 selected from the group consisting of a conductivity meter, a pH meter, a hydrometer, a reflective index meter, a sound velocity meter, an infra-red spectrometer, and a densitometer. In a preferred embodiment, a densitometer is utilized. Thus, this step of analyzing and adjusting the contaminant-content of the feed operates through the measurement of certain physical properties of the feed to determine its contaminant concentration. The relationship of such properties to feed composition is well known to those of skill in the art and/or is easily determined by empirical techniques.

Once the contaminant concentration is measured, the feed may be brought to a chosen concentration, either through the addition of chemical compound (e.g., acid), thus decreasing the contaminant concentration in the resultant feed, or through the addition of contaminant (e.g., water), thus increasing the contaminant concentration in the resultant feed.

The feed meter pump 12 permits the feed flow rate to be preset according to the contaminant concentration of the feed and maintained substantially constant throughout the distillation. The feed meter pump 12 is situated in fluid communication with the distillation column 16 of the distillation apparatus, through a second feed tube 14. Alternatively, said feed meter pump may operate in combination with a flow meter 30 in one preferred embodiment. This second feed tube 14 fluidly communicates through the wall of the distillation column 16 in any number of ways commonly known in the art, for instance, in apparatus constructed of glass or quartz, the second feed tube 14 may be glass blown with and through the wall of the distillation column 16. Or, in apparatus constructed of metal alloys, plastics and other polymers, or even glass or quartz, screw type fittings may be provided.

The second feed tube 14 of a preferred embodiment is further connectively attached to the feed down-tube 15 through feed port 9. The feed down-tube 15 of this embodiment extends down into the liquid phase at the bottom of the column 16 and assists in preheating and fully mixing the incoming feed. As will be understood, the preferred feed location of a preferred embodiment of the present invention is unique. Usually, the art feeds products sought to be separated in to the midsection of a distillation column. A column thus prepared comprises a stripping section and a rectifying section. Instead, a preferred embodiment of a distillation apparatus prepared in accordance with the present invention comprises only a rectifying section.

A column prepared with only a rectifying section is particularly appropriate where water is being removed from a high boiling inorganic acid, such as sulfuric acid. In certain situations, however, it is preferable to prepare the distillation apparatus with both a stripping section and a rectifying section. For example, where certain organic solvents are separated and/or concentrated in accordance with the present invention, it is preferable to provide stripping and rectifying sections, i.e., removal of more volatile ketones or ethers from a less volatile alcohol. In such situations, the feed down-tube 15 is eliminated, and the contaminated product feed is accomplished by situating the feed port 9 higher on the column of the distillation apparatus 16.

As will be seen, the first and second feed tubes, 11 and 14, and the feed meter pump 12, as well as the feed down-tube 15 could be easily substituted or replaced by any number of conventional feed connections and/or arrangements, or, even eliminated altogether without departing from the invention described herein. It will also be appreciated that the distillation column 16 is but one example of a suitable distillation apparatus envisioned in accordance with the present invention as mentioned above.

In a preferred embodiment, the feed collects in the base of the distillation column 16 in an area designated herein as the distillation container 17. The feed down-tube 15 extends down into this container 17. As will be understood, the distillation container 17 functions as a reboiler. Many other configurations of the distillation container 17 will function adequately. However, the distillation container 17 of the preferred embodiment has the advantages of simplicity of cleaning, ease of feed and removal capabilities, even distribution of heat, and efficiency of heating.

When the apparatus is heated by a heater 18, which in a preferred embodiment comprises a resistance heater surrounding the lower portion of the distillation container 17, the feed, herein the contaminated chemical compound, will be heated and the more volatile component, herein the contaminant, will be more rapidly vaporized. In another preferred embodiment, the heat source is a direct heat source 31. The vapors so produced will gradually rise up through the distillation column 16 and will come into good contact with the downwardly flowing condensate as the reflux stream. Through such distillation, the contaminant level in the vapor will increase along the height of the distillation column 16. In one preferred embodiment, the distillation column may contain packing material 32 selected from the group consisting of Raschig rings, Lessing rings, Berl saddles, spiral partition rings, and grid packing. Essentially, only the vaporized contaminant will reach the distillate condenser 19 which is in fluid communication with the distillation column 16 through the distillate condenser opening port 20 at the top of the distillation column 16. A means for monitoring the temperature of the condensing vapor 33, is present in one preferred embodiment.

The distillate condenser 19 is one example of a condensing chamber apparatus envisioned in accordance with the present invention, as mentioned above.

One embodiment of the above-mentioned distillate collection apparatus is adapted to remove only a portion of the distillate produced through the condensation of the contaminant from the distillate condenser 19. This objective is accomplished in a preferred embodiment through the use of the distillate collection cup 21 which is in fluid communication with distillate meter pump 22 through distillate removal port 23. The distillate collection cup 21 is but one apparatus envisioned to achieve the partial distillate collection of the present invention.

Through varying the rate at which distillate is withdrawn from the distillation apparatus, it will be understood that one is able to control the distillate returning to the column, i.e., the reflux ratio, that consequently, as will be discussed next, effects the contaminant concentration in the product. In a preferred embodiment, only a portion (e.g., 10%, 20%, 30%, 50%, 75%, 90%) of the distillate is removed from the column. Distillate is removed at a constant rate.

Back in the distillation container 17, the contaminant concentration in the feed has been decreased through the distillation of the contaminant from the chemical compound. The remaining chemical compound may be removed through the product removal port 24. The product removal port 24 is but one example of a product removal port envisioned by the present invention. A product removal port in accordance with the present invention may advantageously operate as a simple overflow outlet to the distillation container 17. The product removal port 24 is in fluid communication with the product tank 29 through a first product removal tube 25, an optional after-cooler 26, and a second product removal tube 27, with an anti-syphon vent, herein designated as the syphon break vent 28.

As was mentioned above, there are a number of methods to suitably provide fluid communication through the wall of the distillation column 16 commonly known in the art, for instance, in apparatus constructed of glass or quartz, the product removal port 24 may be formed through the wall of the distillation column 16 using well known glass blowing techniques. Or, in apparatus constructed of metal alloys, plastics and other polymers, or even glass or quartz, screw type fittings may be provided.

The after-cooler 26 may be utilized in any application. However, the after cooler 26 is particularly valuable in situations where high boiling or corrosive chemical compounds are to be concentrated, separated, and purified. In routine applications, therefore, as will be appreciated by one skilled in the art, only a first product removal tube 25 would be necessary to fluidly communicate between the product removal port 24 and the product tank 29.

As was mentioned above, the feed pump 12, and the distillate pump 22, simply provide but one method to control flow rates and quantities of materials collected. There are a variety of pumps that will accomplish this objective. For instance, metering pumps and peristaltic pumps are preferred because of their inherent controllability.

The use of pumps is not essential to the present invention. Instead, a system can easily be configured that utilizes gravity feeding, with valves or controlled area orifices comprising the method to control the flow rates. Such valves may be manually controlled or electronically controlled, for instance through use of solenoid valves and a microprocessor controller. In addition, one may readily configure a system that collects a given quantity of the material and thereafter discharges such material from collection, for instance, through a syphon or other drain system which can be controlled by a timer.

In accordance with one aspect of the preferred embodiment, a heat source provides thermal energy to vaporize the contaminant present with the chemical compound. The heat source may include direct and indirect heat sources. Examples of direct heat sources that may be suitably employed in the present invention are electric immersion heaters, other heat exchangers, or external electric heat sources, or through burning fossil fuels or petroleum based products. Indirect heaters are those wherein a material is heated elsewhere and transported into or around, for instance, the distillation container 17, such as steam or oil. For certain applications, as will be appreciated by one skilled in the art, one could inject steam directly into the contaminated chemical compound (e.g., through a second down-tube into the container 17) to effect the distillation process. But, steam injection will not be appropriate where water is sought to be removed from a less volatile inorganic acid.

The choice of a heat source will primarily depend upon the physical properties of the chemical compound and its contaminant. In a preferred embodiment, wherein the chemical compound comprises an inorganic acid, and particularly, sulfuric acid, and the contaminant is water, a preferred heat source is a resistance heater 18 surrounding the lower portion of the distillation container 17 in FIG. 1.

Figure 2:
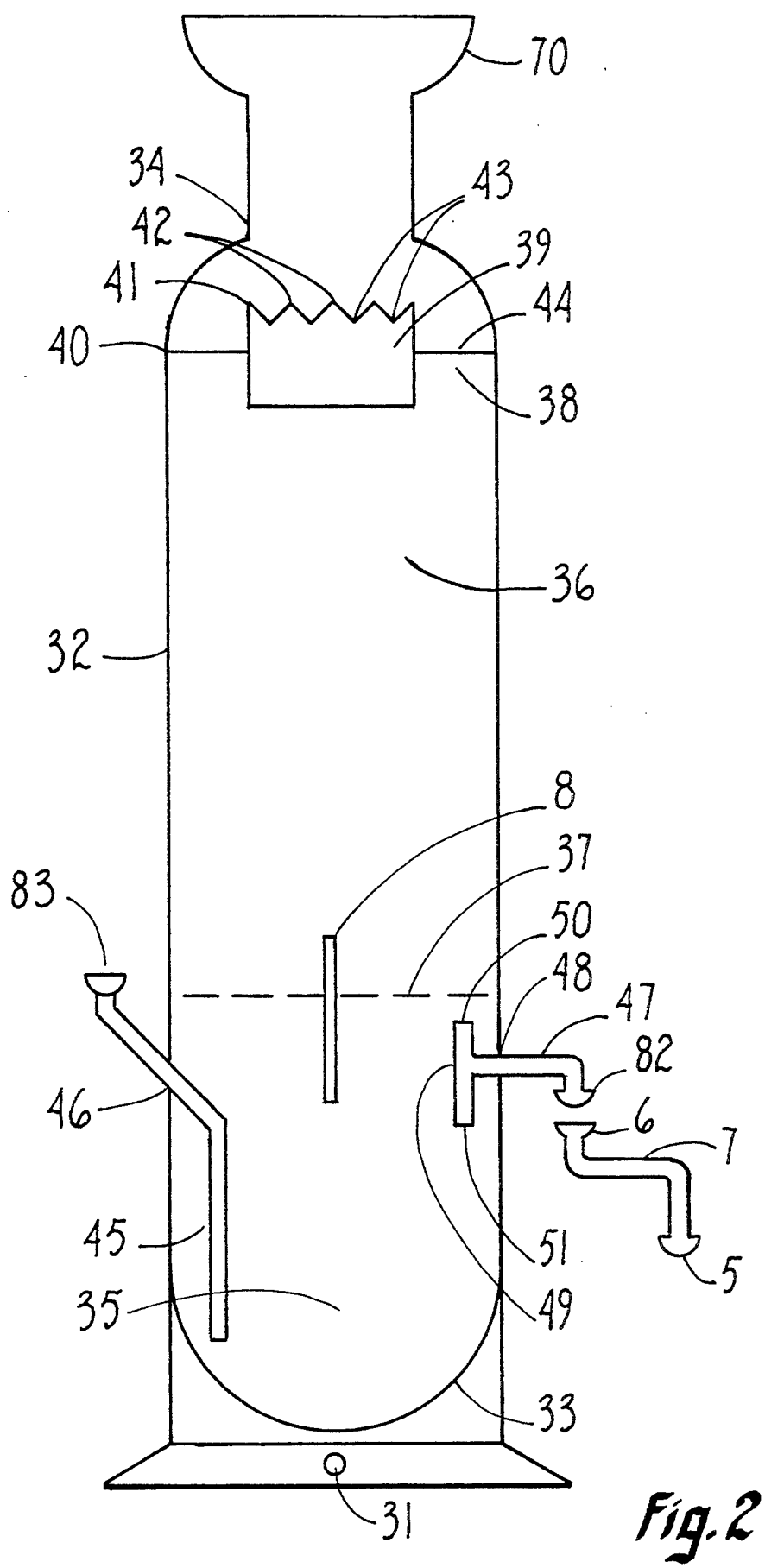
FIG. 2 is a sectional view of a preferred distillation column.

Referring now to FIG. 2, there is illustrated a sectional view of a distillation column of a preferred embodiment of the present invention. As was mentioned above, the distillation column 32 represents but one example of a distillation apparatus envisioned by the present invention. A distillation apparatus is characterized by a substantially vertical upward flow of evaporated liquid, and a downward counter-current flow of condensed liquid. As the vapor and liquid phases in the distillation column 32 come into contact, heat is exchanged between the condensed liquid moving down the column and the vapors moving up the column. Through the physical interaction of these phases, the vaporous phase will become enriched in the more volatile component and the liquid phase will become enriched in the less volatile component. Consequently, the vapor going toward the condenser will contain predominantly the more volatile component and the less volatile component will return to the distillation container 35.

Additionally, plates or packing may optimally be provided in the flow path onto which the liquid components may collect and to ensure efficient vapor-liquid contact, thus enhancing the separation between the more volatile and the less volatile components. Referring again to FIG. 2, there is provided a packed section 36, that is defined by and confined within the section between the bottom packing containment 37 and the top packing containment 38. In the preferred embodiment, the bottom packing containment 37 comprises a stop plate, and the top packing containment 38 comprises an overflow weir 39.

Suitable packing materials may be selected from the group consisting of Lessing rings, Berl saddles, spiral partition rings, grid packing, or Raschig rings. Such packing material may be used alone or in combination with another or others, depending upon the application. In a preferred embodiment, the packing material comprises Raschig rings.

The number of plates or packing height necessary for a suitable separation of two separate compounds of differing vapor pressures or volatilities may be calculated, and a suitable apparatus prepared accordingly, in a manner well known in the art. In theory, the more plates or the greater the packing height provided the better the separation between the compounds. However, there is a point of diminishing return in terms of performance, price, and back pressures in preparing columns with a high number of plates or a high packing height. Thus, the art commonly prepares standard columns that provide a reasonably high number of plates or a reasonable packing height, yet that perform efficiently, are not overly expensive, and do not operate at excessive back pressures.

Thus, a suitable distillation apparatus for the present invention may comprise any commonly used distillation equipment known in the art, including other configurations of distillation columns. Also, columns may be selected from the group consisting of bubble-cap type, sieve plate type, or cartridge type. But, packed columns are preferred because of their simplicity, process flexibility, and low costs. In addition, columns may be jacketed, or insulated, to cut down on heat loss. Additionally, mechanical spinning columns may be utilized.

Also, in some applications, one could eliminate the distillation column 32 and still obtain the benefit of the present invention through a one-stage evaporation process. However, in a preferred embodiment, the distillation column 32 provides the required separation between the chemical compound and its more volatile contaminant or contaminants.

In a preferred embodiment, the distillation column 32 comprises an elongated cylindrical or tubular column of substantially uniform geometry. The distillation column 32 possesses a substantially closed end 33 and a substantially open end 34. In a preferred embodiment, the area or space defined by and confined within the substantially closed end 33 comprises the distillation container 35.

In this embodiment, the distillation container 35 and the distillation column 32 are a single unit. But, one may easily utilize a separate distillation container, for instance, a round bottom flask, or otherwise, connected with an appropriate fitting to the distillation column 32, as in a tapered joint, a ball joint, or a flange joint.

The distillation container 35 may have a drain port 31 located at the bottom of the distillation column 32 in the center of the substantially closed end 33. This drain port is useful in cleaning processes, and may optionally be used to withdraw product in certain applications. As will be understood, each of these functions may be accomplished in other similar ways.

In another preferred embodiment an overflow weir 39 is provided in the column 32 below the reflux condenser, as shown in FIG. 2. As will be appreciated, overflow weirs in general are useful in maintaining a steady and uniform return of a distillate back into the distillation column 32, thus aiding in avoiding pressure surges and flow fluctuations in the distillation columns 32. Also, overflow weirs generally act to redistribute the reflux stream evenly over the packing material in the distillation column 32 which improves the vapor/liquid contact in the column and thus increases the efficiency in separation. Without the use of the overflow weir 39, it is possible to experience a channeling effect along the edges of the walls and the inner portion of the distillation column 32.

In a preferred embodiment, the overflow weir 39 is designed to provide an area in which to capture limited quantities of distillate generated through the start-up of the distillation apparatus and then to redistribute such captured distillate back into active participation in the reflux process. In a preferred embodiment, the overflow weir 39 comprises a partially occluding structure contained within the distillation column 32 which further comprises the plate edge 40 that is substantially sealingly joined or connected to the wall of the distillation column 32 and the upper edge 41 that is generally extended inward and elevated in relation to the plate edge 40. Further, in a preferred embodiment, the upper region 44, defined by the space between the plate edge 40 and the upper edge 41, is not direct communication with the packed section 36. Instead, distillate that is captured in the upper region 44 must communicate over the upper edge 41. Consequently, prior to the distillate returning to active participation in the reflux process, enough distillate must be captured in the upper region 44 to overflow over the upper edge 41.

In addition, the overflow weir 39 of the preferred embodiment is unique; it comprises a upper edge 41 that is of inconsistent geometry. The preferred geometry of the upper edge 41 of overflow weir 39 of a preferred embodiment is generally serrated or is v-notched, wherein the upper edge 41 comprises a series of alternating points 42 and depressions 43. The v-notch design of a preferred embodiment of the present invention acts to further stabilize flow fluctuations by more uniformly distributing the flow back into participation into the distillation column 32 over conventional overflow weirs.

The objectives accomplished by the overflow weir 39 in the present invention may be accomplished through a variety of acceptable configurations that are commonly known in the art. The inconsistent geometry of the upper edge 41 in a preferred embodiment may be accomplished in a number of ways, for instance, by fluting or slotting the upper edge or by incorporating a plurality of holes in the upper edge, or other similar designs.

Referring again to FIG. 2, in the lower portion of the distillation column 32, there is provided a feed port, that, in a preferred embodiment, further comprises a feed down-tube 45. In the preferred embodiment, the feed down-tube 45 communicates fluidly through the wall 46 of the distillation column 32. This arrangement enables the delivery of feed into the distillation column 32 in the distillation container 35. Also, in a preferred embodiment, the feed down-tube 45 extends toward and near the bottom of the distillation column 32 in the distillation container 35. In this way, the incoming feed is well mixed, as well as preheated, with the boiling liquid in distillation container 35.

The particular illustrated arrangement of feed down-tube 45 in the preferred embodiment is but one example of a feed delivery port envisioned by the present invention. Other methods of feed delivery commonly utilized in the art may be substituted without departing from the ambit of the present invention. For example, as mentioned above, this arrangement provides a column without a stripping section; in certain applications a stripping section may be desired, thus, the feed down-tube 45 may be eliminated.

Also, in the lower section of the distillation column 32, there is provided a product removal port, that in a preferred embodiment comprises the product removal port 47. In the preferred embodiment, the product removal port 47 provides fluid communication through the wall 48 of the distillation column 32. This arrangement enables the removal of the product directly from the distillation container 35. In a preferred embodiment, the product removal port 47 further comprises a stand tube 49 that further comprises a first open end 50 and a second open end 51. In a preferred embodiment, the first open end 50 extends generally upward and the second open end 51 extends generally downward. The second open end 51 allows for the discharge or overflow of boiling chemical compound which comprises the product with a reduced concentration of contaminant. The first open end 50 operates as a vent to assist in the smooth removal of product through the product removal port 47 from the distillation container 35 in the distillation column 32.

In a preferred embodiment, there is also deployed in the distillation column 32 a thermal well 8, for the analysis and measurement of a number of parameters. For instance, in one embodiment the thermal well 8 further comprises a thermocouple, to measure the temperature of the boiling liquid in the distillation container 35. By measuring the temperature, one is able to determine the concentration of the less volatile component in the boiling liquid in the distillation container 35.

Figure 3:
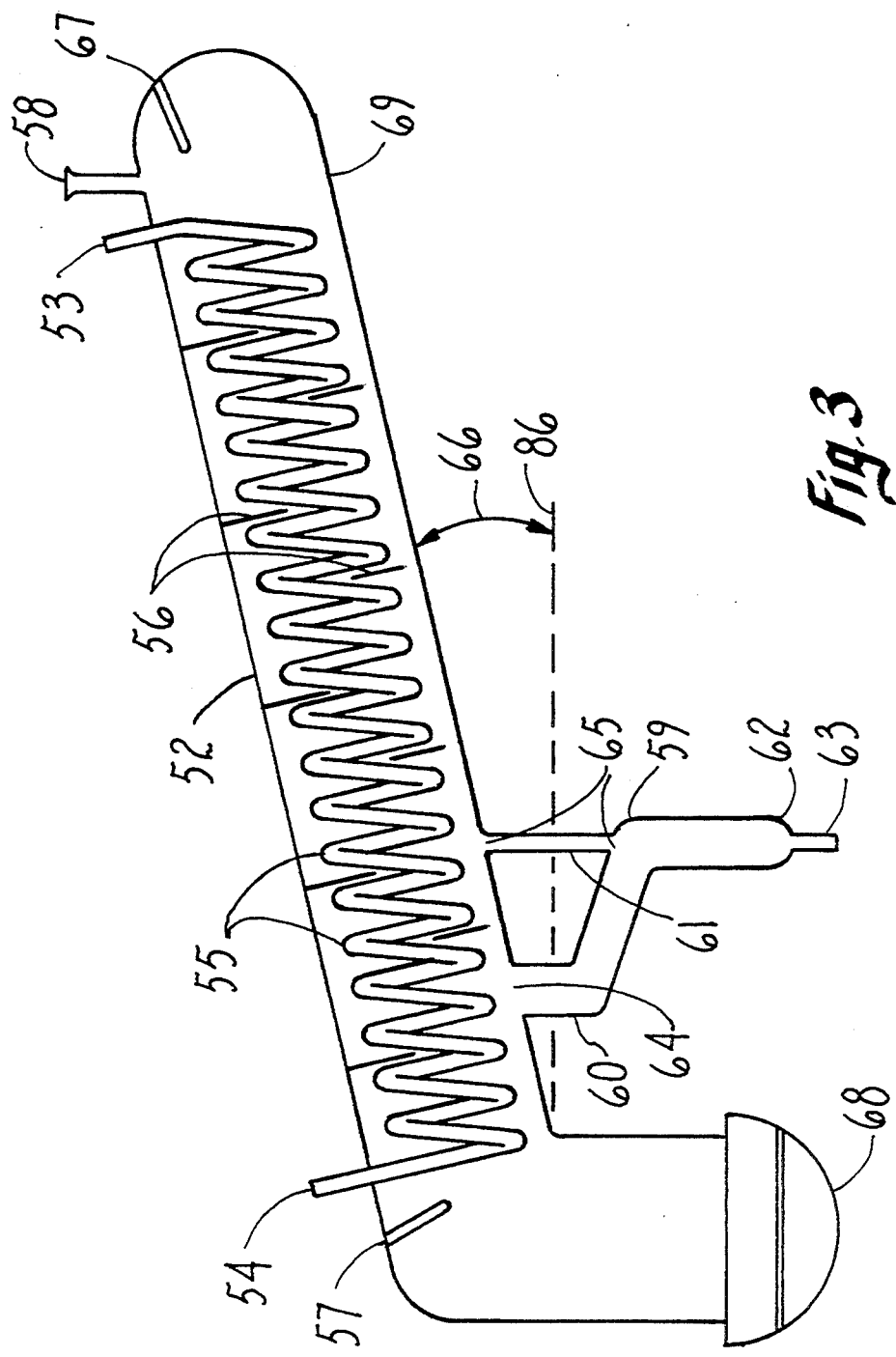
FIG. 3 is a sectional view of a distillate condenser.

Referring now to FIG. 3, there is illustrated a sectional view of a distillate condenser of a preferred embodiment of the present invention. As was mentioned above, the distillate condenser 52 represents an example of a condensing chamber envisioned in accordance with the present invention.

The distillate condenser 52, in a preferred embodiment comprises an elongated, water cooled, container. The distillate condenser 52 utilizes cooling coils 55 to condense vapor into distillate. The cooling coils 55 further comprise the cooling medium inlet 53 and the cooling medium outlet 54. Further, in a preferred embodiment, the cooling coils 55 are spiral, maximizing their surface area, and, as will be seen, the cooling medium flows counter-current to the vapor flow to maximize the cooling efficiency. Of course, double coils may be employed when highly efficient cooling is required. To ensure that the distillate comes into optimum contact with the cooling coils 55, there are also deployed a series of baffle plates 56. The baffle plates 56 are equally spaced and connectively attached to the interior of the outer wall of the distillate condenser 52.

A preferred embodiment also incorporates two temperature-sensing thermal wells 57 and 67, respectively. Thermal well 57 is strategically located to monitor the temperature of the vapor going into the condenser, thus allowing one to monitor the content of the less volatile compound in the vapor. Similarly, thermal well 67 is located so as to monitor the temperature in the condenser after the vapor has passed all or substantially all of the coiling coils. This positioning allows one to monitor whether any of the vapor has not condensed in the distillate condenser 52.

In a preferred embodiment, the temperature sensing apparatus deployed in both of the thermal wells 57 and 67 are thermocouples. In addition, the thermocouple in the thermal well 67 is preferably in communication with a circuit which can sound an alarm, turn off or vary the heating power to the system, check and increase the flow of cooling medium through the cooling coils 55, or other similar steps or combinations of such steps. Also, the thermocouple in thermal well 57 may be communicated through the same circuit, or another circuit, so as to enable similar control steps, as mentioned above. The function of the thermal wells in monitoring temperature assists in determining the efficiency of the overall concentration, separation, and purification. Of course, other temperature sensing apparatus could be suitably used in place of thermocouples, and other control functions could be triggered without departing from the ambit of the present invention.

Also incorporated in a preferred embodiment of the present distillate condenser 52, there is provided a distillate condenser vent 58. The distillate condenser vent 58 aids in preventing the buildup of pressure within the distillation apparatus and reduces fluctuations in flows in the distillation apparatus.

Still referring to FIG. 3, there is further provided a distillate collection port, that in a preferred embodiment comprises the distillate collection system 59. As was mentioned above, the distillate collection system 59 represents an example of an apparatus to collect distillate envisioned in accordance with the present invention. The distillate collection system 59 of the preferred embodiment comprises a distillate collection stand tube 60, a vent stand tube 61, a distillate collection cup 62, and a distillate removal port 63. In the preferred embodiment, both the distillate collection stand tube 60 and the vent stand tube 61 provide fluid communication between the distillate condenser 52 and the distillate collection cup 62 through the distillate collection port 64 and the vent port 65. Further, in a preferred embodiment, both the distillate collection port 64 and the vent port 65 are located on the center line of the underside 69 of distillate condenser 52. Thus, both the distillate collection port 64 and the vent port 65 will collect a given quantity of distillate to fill the distillate collection cup 62. However, in a preferred embodiment, both because of the size differentials between the distillate collection port 64 and the vent port 65, and their locations, the distillate collection port 64 will carry a predominant quantity of the distillate to the distillate collection cup 62. A cooling coil or cooling jacket may be added to the distillate collection cup 32.

A further novel attribute to the distillate condenser of a preferred embodiment of the present invention is the positive angle 66, in relation to horizontal 86, at which the distillate condenser 52 operates. The preferred angle is from about 2° through 20°, with 5° believed optimum in the present invention. The utilization of an angle, herein the angle 66 in a preferred embodiment, tends to provide a smooth overflow stream of distillate to the distillation column as the reflux, and to enrich the concentration of contaminant in the vapor coming into the distillate condenser 52. Consequently, as was discussed above, a more even and lower contaminant-content is obtained in the product.

As was discussed above, the distillate collection system 59 of a preferred embodiment provides a simple apparatus to collect a substantial portion of the distillate. However, it is important that distillate is not collected to depletion, because, as will be understood, it is preferable that some quantity of the distillate overflow back to the distillation column and participate in the reflux in order to maintain an enriched contaminant-content in the distillate.

The condensing chamber apparatus of the present invention may be accomplished through a variety of acceptable configurations that are commonly known in the art. For instance, for one could arrange a condenser of a conventional apparatus that had a zero or negative angle to horizontal and was capable of completely withdrawing the distillate from the condenser but that has an intake port at the top of a distillation column for some portion of the distillate to flow back to the distillation column as the reflux stream. Or, referring now to FIG. 2, a condensing chamber could be mounted vertically at the top of the distillation column 32. In such an arrangement, the bottom part of the condenser could be similar to the overflow weirs, described above for the reflux stream, and could further include a drain port or ports to allow continuous removal of the distillate from the distillation apparatus.

Referring now back to FIG. 2, in the preferred embodiment, the distillation column 32 is in fluid communication with the condensing chamber to assist in the removal of the contaminant from the chemical compound. This objective is accomplished in the preferred embodiment by providing at the top of the distillation column 32 a female ball joint 70, that, referring now to FIG. 3, is capable of forming a substantially sealed connection with the distillate condenser 52 through a male ball joint 68. Accordingly, as distillation is undertaken in the preferred embodiment, the less volatile contaminant is driven from the contaminated chemical compound mixture as a vapor through the distillation column 32. Thereafter, the vapor travels through the top of the distillation column 32 through the female ball joint 70 and, referring now to FIG. 3, enters the distillate condenser 52 through the male ball joint 68. This fluid communication was referred to previously as the distillate condenser opening port 68. Through the operation of the distillate condenser 52, the vapor condenses as a liquid distillate and a portion of it may be easily removed from the distillation apparatus through utilization of a distillate collection port, which in the preferred embodiment of the present invention comprises the distillate collection system 59, described above, or other suitable methods which are also discussed above. The remainder of the liquid distillate may then overflow from condenser 52 back to distillation column 32 through port 68, as the reflux.

Figure 4:
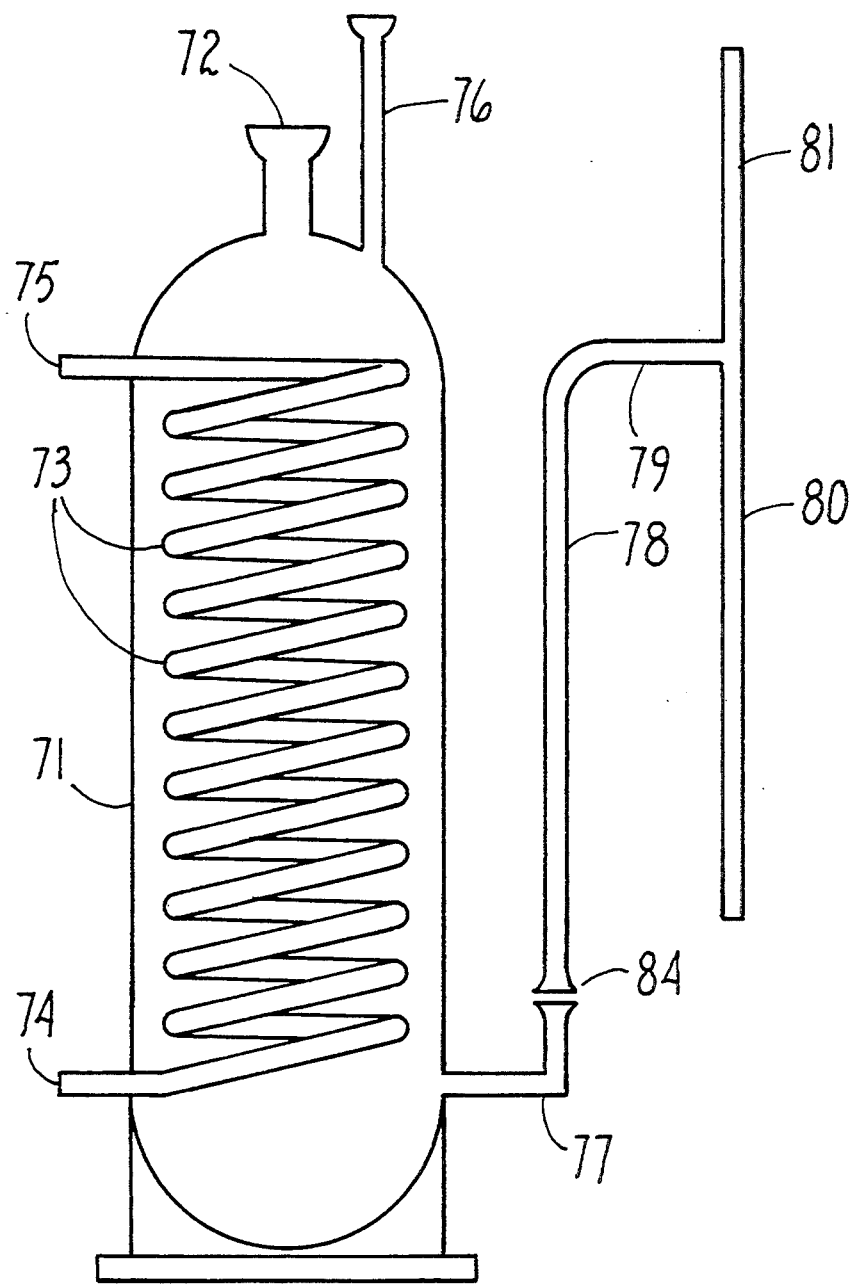
FIG. 4 is a sectional view of an after-cooler used in the present invention.

Referring now to FIG. 4, there is illustrated a sectional view of an after cooler of a preferred embodiment of the present invention. The illustrated after cooler 71 represents an example of an after cooler apparatus envisioned in accordance with the present invention. The preferred after cooler 71 comprises an elongated, water cooled, column. As will be appreciated by one skilled in the art, the after cooler 71 aids in cooling the product removed through the product removal port of the present invention, which in the case of the preferred embodiment, referring back to FIG. 2, comprises the product removal port 47, of the distillation column 32, with its stand tube 49 with its first and second open ends, 50 and 51, respectively. In the preferred embodiment, the product removal port 47 of FIG. 2 is in fluid communication with the after cooler 71 of FIG. 4 through a hot product inlet port 72.

Also referring to FIG. 2, there is provided, in a preferred embodiment, a transfer line 7 through which product removed from the distillation container 35 is directed. The transfer line 7 possesses an "s" shape with a female ball joint 6 on one end, and a male ball joint 5 on the other end. This arrangement, in a preferred embodiment, and as will be appreciated by one skilled in the art, allows the female ball joint 6 to be connected to the male ball joint 82 of the product removal port 47 so as to minimize leakage of product. And, similarly, the male ball joint 5, on the other end of transfer line 7, can be connected either directly to, or through the use of another transfer line, to the after cooler 71 of FIG. 4, also with a minimum of leakage. For example, in a preferred embodiment, the male ball joint 5 on the transfer line 7 can attach to a hot product inlet port 72, which is a female ball joint on the after cooler 71. Additionally, the transfer line 7 allows for a certain amount of play when bringing the distillation column 32 into fluid communication with the after cooler 71 of FIG. 4. Thus, chances of breakage, either during assembly or during operation, for instance, from vibration, thermal expansion, or sudden movements, is minimized.

Turning our attention again to FIG. 4, hot product enters the after cooler 71 through the hot product inlet port 72. Hot product thereafter encounters the cooling coils 73, which in the preferred embodiment comprise a cooling fluid inlet 74 and a cooling fluid outlet 75. Further, the cooling coils 73 of the preferred embodiment are spiral, maximizing their surface area and accordingly maximizing the contact of the hot product with the cooling coils 73 and thus lowering the temperature of the product. In a preferred embodiment, the flow path of the product is top to bottom which, as a consequence, and as will be appreciated by one skilled in the art, allows for an efficient and simple gravity feed. Such ability to gravity feed and cool the product is particularly advantageous where the product has a high boiling point and/or is corrosive. Such an arrangement avoids the use of more exotic pump type cooling systems or otherwise, and, in the case of very high boiling and/or highly corrosive products, other cooling systems may simply be unavailable.

A preferred embodiment of the after cooler 71 further comprises a upper vent 76 and a cooled product outflow port 77. The upper vent 76, as will be appreciated by one skilled in the art, assists in steady hot product delivery to after cooler 71 and also in efficient removal of cooled product from the after cooler 71 without overly disrupting, or interfering with, additional hot product delivery to the after cooler 71 through the hot product inlet port 72.

Such cooled product removal is accomplished in the preferred embodiment through the cooled product outflow port 77. In a preferred embodiment, as was mentioned above, the cooled product outflow port 77 is located elevationally lower than the hot product inlet port 72. The cooled product outflow port 77 may be connectively and fluidly communicated to cooled product stand tube 78, which, in a preferred embodiment, comprises a flexible tube so that the elevation of the top portion of cooled product stand tube 79 may be easily adjusted. Optionally, in a further embodiment, the top portion of cooled product stand tube 79 is connectively and fluidly communicated to a stand tube 80 to deliver the product into product tank 29 of FIG. 1 which is deployed at a lower elevation than the liquid level in the after cooler 25 of FIG. 1. In an embodiment that utilizes the stand tube 80, it is both preferred and important to utilize a vent to avoid the syphon effect. In a preferred embodiment, this is accomplished through the use of a vent tube 81 located at the highest point of tube 79.

The arrangement of the above discussed cooled product stand tube 78 to vary the elevation of the top portion of cooled product stand tube 79 with the stand tube 80 and syphon-breaking vent tube 81, allows product to collect within the after cooler 71 until it reaches the elevation of the top portion of cooled product stand tube 79. Thereafter, the cooled product will start flowing from the after cooler 71 through the stand tube 80. As the hot product continuously overflows from the distillation container 35, of FIG. 2, into the after cooler 71, of FIG. 4, the liquid level in the after cooler 71 will build up until the flow rate of the cooled product matches the flow rate of the hot product entering the after cooler 71. Thereafter, once the liquid level in the after cooler 71 attains its steady level, as determined by the height of the top portion of cooled product stand tube 79, such level will reflect the cooling area actually used for cooling in the after cooler 71. The syphon-breaking vent tube 81 will break the syphon effect and keep the liquid level steady in the after cooler 71.

As will be understood, an apparatus built according to the method and apparatus of the present invention may be comprised of many materials. For instance, metals, plastics or other polymeric materials, glass, quartz, or combinations of these materials. When distilling highly corrosive and/or high boiling contaminated chemical compounds, it is preferred to construct the distillation apparatus, including the after cooler, of glass or optimally quartz so as to achieve a high purity product. Also, any of the other components that are in close proximity to the regions of elevated temperature or are more susceptible to corrosive chemical interactions should also preferably be constructed of glass or optimally quartz, or alloys. These components include, the distillate collection apparatus, the feed port and any connections that are in the immediate vicinity of the distillation apparatus, and the product removal port and any connections that are in the immediate vicinity of the distillation apparatus.

Other components that are not as highly susceptible to attack by corrosive chemicals and that are not as proximate to regions of elevated temperatures should also be constructed from other inert materials, so as to maintain product purity, but need not be as exotic as glass or quartz or alloys. For instance, plastics may suitably used, and/or preferably polymers. In a particularly preferred embodiment, fluorinated polymers are used. As will be understood, PFA is particularly suitable for use in the present invention when the chemical compound is sulfuric acid, because it is easily molded and it has a high chemical resistance to sulfuric acid, among other corrosive compounds, and it is highly durable.

In the preferred embodiment, where the chemical compound is an inorganic acid and the contaminant is water, the distillation column, including its packing and overflow weir, the distillate condenser, and the after cooler are constructed of glass or quartz. As discussed above, these apparatus could also be constructed of stainless steel and certain other alloys if they are non-corrosive against the acid.

In addition, certain of the components, because of their proximity to elevated temperatures are also constructed of glass or quartz, and could optionally be constructed of certain alloys. These components include, the feed port, which in a preferred embodiment comprises the feed down tube, the product removal port and its connections, which are described above, and the distillate collection system, even though there is little corrosive effect in the distillate condenser, and temperatures in the distillate collection system are substantially lower than those in the other components just mentioned.

Similarly, in a preferred embodiment, the connections or joints utilized to connect the components, where such are in proximity to regions of elevated temperature or are susceptible to corrosive effects, and the connection between the distillate condenser and distillation column, comprise male and female ball joints constructed of glass, or preferably quartz. In the preferred embodiment, referring now to FIG. 2, for instance, the joint 82 between the product outflow port from the distillation column 32 and its connection to the after cooler is so constructed. Also, the joint 83 between the feed down tube 45 into the distillation column 32 and its connection that brings it into fluid communication with the feed tank is so constructed.

The less thermally and caustically exposed components of the preferred embodiment utilize plastics and preferably fluoro polymers. For instance, the feed tank, the product tank, various process connections, and fittings, and the wet parts of all pumps and solenoid valves are so constructed. Likewise, the connecting joints that are situated away from heat may be constructed from plastics and preferably fluoro polymers.

An example, referring now to FIG. 4, is the joint 84 connecting the cooled product outflow port 77 from the after cooler 71 to the cooled product stand tube 78. With the incorporation of the after cooler 71, in a preferred embodiment, the joint 84 need only be constructed of a plastic and preferably a fluoro polymer such as TFE. This is so because the product will be cooled in after cooler 71. Consequently, as will be appreciated, a TFE conical joint is preferable for the construction of the joint 84, because of its chemical stability. TFE is also preferred for tubes 79, 80, and 81.

The present invention is further illustrated through the results obtained and presented in Table I, below. In Table I, a variety of feed concentrations of sulfuric acid as the chemical compound and water as the contaminant are presented. The apparatus utilized to obtain the results presented was a distillation column, similar to that illustrated in FIG. 2, that was in fluid communication with a distillate condenser, similar to that illustrated in FIG. 3, and, the distillation column's product removal port was in fluid communication with an after cooler, similar to that illustrated in FIG. 4.

The apparatus used in connection with the experimental results utilized a distillation column that was 72 inches (182 cm) in height, with an inner diameter of 6 inches (15.24 cm). The distillation column was packed with ¼ inch (0.64 cm) Raschig rings, filling 24 inches (60.96 cm) of the distillation column. Further, the distillation column possessed an overflow weir similar to that illustrated in FIG. 3.

The distillate condenser was 32 inches long (81.28 cm), with an inner diameter of 5 inches (12.70 cm), with cooling coils possessing a surface area of 6 ft$^2$ (0.56 m$^2$), and the water running through the cooling coils was 20°

C. at 1 gallon per hour (3.79L). The after cooler was 32 inches long (81.28 cm), with an inner diameter of 8 inches (20.32 cm), with coiling coils possessing a surface area of 6 ft² (0.56 m²), and the water running through the cooling coils was 20° C. at 1 gallon per hour (3.79L).

The heater for the present results contained in Table I was an electric furnace rated at 40 kW. As was mentioned above, the power to the heater was maintained substantially constant throughout the process for each experiment.

TABLE I

| Example No. | Power % | Feed Conc. | Product Wt. % | Product ml/min | Distillate Wt. % | Distillate ml/min |
|---|---|---|---|---|---|---|
| 1 | 82 | 90.5 | 95.2 | 1200 | 4.05 | 105 |
| 2 | 59 | 86.0 | 94.6 | 600 | 3.34 | 132 |
| 3 | 79 | 84.7 | 91.0 | 980 | 1.41 | 136 |
| 4 | 58 | 76.4 | 91.6 | 465 | 1.39 | 148 |
| 5 | 89 | 81.3 | 92.5 | 925 | 2.20 | 204 |
| 6 | 78 | 73.5 | 90.9 | 590 | 1.66 | 216 |
| 7 | 47 | 53.8 | 90.3 | 125 | 1.16 | 210 |
| 8 | 85 | 80.0 | 91.0 | 850 | 1.50 | 200 |

The results presented in Table I demonstrate the efficacy of the present invention in concentrating, separating, and purifying contaminated chemical compounds, wherein the chemical compound is less volatile than the contaminant.

The foregoing description details specific methods and specific equipments that can be employed to practice the present invention, and represents the best mode contemplated. However, it will be apparent for those of ordinary skill in the art that the disclosed embodiments may be modified without departing from the essence of the invention. For example, although the method of the present invention is specifically illustrated with respect to systems in which water is removed from concentrated acids, it is equally suitable for the purification of any number of contaminated chemical compounds wherein the chemical compound is less volatile than the contaminant. Similarly, the distillation apparatus can be easily adapted to meet specific requirements. Thus, however detailed the foregoing may appear in text, it should not be construed as limiting the overall scope hereof; rather, the ambit of the present invention is to be governed only by the lawful construction of the appended claims.

What is claimed is:

1. An apparatus for removing a liquid contaminant from a chemical compound, wherein said chemical compound is less volatile than said contaminant, comprising:
   a distillation apparatus, wherein said distillation apparatus further comprises:
   means for introducing said contaminated chemical compound into said distillation apparatus at a constant flow rate;
   a container for receiving said contaminated chemical compound;
   means for applying heat to said container at a constant rate to vaporize said contaminant;
   a condensing chamber in fluid communication with said container for condensing the vaporized contaminant at a particular rate;
   means for removing condensed contaminant from said condensing chamber and said distillation apparatus at a constant rate that is less than the rate at which said contaminant is condensed in said condensing chamber;
   means for removing said chemical compound from said container;
   means for maintaining a constant reflux ratio by removing the vaporized contaminant at a constant rate so as to maintain a constant reflux ratio within said distillation apparatus; and
   means for returning refluxed condensed contaminant remaining in said condensing chamber back to said distillation apparatus.

2. The apparatus of claim 1, wherein said means for applying heat is a direct heat source.

3. The apparatus of claim 2, wherein said heat source is an electrical resistance heater.

4. The apparatus of claim 1, wherein said means for applying heat is an indirect heater.

5. The apparatus of claim 1, wherein said condensing chamber has sufficient cooling area for total condensation of a vapor entering said condensing chamber.

6. The apparatus of claim 5, wherein said condensing chamber comprises a condenser which further comprises an inlet port in fluid communication with an elongated cylindrical supporting column structure with cooling coils deployed within said supporting column structure.

7. The apparatus of claim 6, wherein said condenser further comprises baffle plates adapted to aid in the effective contact of vapor with said cooling coils.

8. The apparatus of claim 6, wherein said condenser further comprises a vent to maintain substantially constant pressures within the distillation apparatus.

9. The apparatus of claim 6, wherein said condenser further comprises one or more means for monitoring the temperature of condensing vapor.

10. The apparatus of claim 6, wherein the supporting column of said condenser defines an axis which is inclined in relation to horizontal, at a positive angle between about 2 and 20 degrees.

11. The apparatus of claim 10, wherein said positive angle is about 5 degrees to horizontal.

12. The apparatus of claim 1, wherein said distillation apparatus further comprises a distillation column interposed between said condensing chamber and said container, providing fluid communication therebetween.

13. The apparatus of claim 12, wherein said distillation column comprises a packed distillation column.

14. The apparatus of claim 12, wherein said distillation column is packed with material selected from the group consisting of Raschig rings, Lessing rings, Berl saddles, spiral partition rings, and grid packing.

15. The apparatus of claim 14, wherein said packing material comprises Raschig rings.

16. The apparatus of claim 12, wherein said distillation column further comprises one or more overflow weirs interposed inside said column below said condensing chamber.

17. The apparatus of claim 16, wherein said overflow weir comprises a partially occluding structure contained within said distillation apparatus, said overflow weir having an attached edge that is substantially sealingly joined or connected to said distillation apparatus and an upper edge that is generally extended inward and elevated in relation to said attached edge.

18. The apparatus of claim 17, wherein said overflow weir comprises an upper edge that is of inconsistent geometry.

19. The apparatus of claim 18, wherein said inconsistent geometry comprises a serrated or v-notched upper edge.

20. The apparatus of claim 1, further comprising means for determining the concentration of said chemical compound or said contaminant prior to introduction of same into said distillation apparatus.

21. The apparatus of claim 20, further comprising means for adjusting the relative concentrations of the chemical compound and a contaminant in a feedstock of the contaminated chemical compound introduced into said distillation apparatus.

22. The apparatus of claim 20, wherein said concentration determining means is selected from the group consisting of a conductivity meter, a pH meter, a hydrometer, a reflective index meter, a sound velocity meter, and an infra-red spectrometer.

23. The apparatus of claim 20, wherein said concentration determining means is a densitometer.

24. The apparatus of claim 1, wherein said means for introducing said contaminated chemical compound further comprises a down tube extending downward into said container.

25. The apparatus of claim 1, wherein said means for removing said chemical compound further comprises a stand tube having a first open end and a second open end, and said tube is adapted to receive chemical compound from said container at a point between said first and second open ends, wherein said first open end extends generally upward from said point and said second open end extends generally downward from said point, said second open end allows for the discharge of boiling chemical compound from said container, and said first open end operates as a vent.

26. The apparatus of claim 1, wherein said introducing means includes either a pump in combination with a flow meter, or a metering pump.

27. The apparatus of claim 1, wherein said distillation apparatus further comprises an after cooler for cooling the chemical compound removed from said distillation apparatus and wherein said after cooler comprises an inlet port and an outlet port.

28. The apparatus of claim 27, wherein said after cooler comprises a cooling column in fluid communication with said chemical compound removing means.

29. The apparatus of claim 28, wherein said cooling column comprises an inlet port separated from an outlet port by a supporting column structure with cooling coils deployed within said supporting column structure.

30. The apparatus of claim 28, wherein said inlet port is located elevationally higher than said outlet port.

31. The apparatus of claim 28, wherein said cooling column further includes a fluid vent.

32. The apparatus of claim 27, wherein said chemical compound removing means permits overflow out of said container through said removing means, and said removing means further comprises connecting means between said container and said after cooler.

33. The apparatus of claim 32, further comprising a product tank that is connected to said after cooler with a flexible tube.

34. The apparatus of claim 33, further comprising a syphon breaking vent at the highest point of said flexible tube, permitting adjustment of the liquid level in said after cooler by moving the highest point of flexible tubing up or down in relation to the after cooler.

35. The apparatus of claim 25, wherein said distillation apparatus further comprises an after cooler for cooling the chemical compound removed from said distillation apparatus and wherein said chemical compound removing means permits overflow out of said container through said removing means, and said removing means further comprises connecting means between said container and said after cooler.

* * * * *